US008537713B2

(12) United States Patent
Sayeed (10) Patent No.: US 8,537,713 B2
(45) Date of Patent: Sep. 17, 2013

(54) CARRIER FREQUENCY ACQUISITION METHOD AND APPARATUS HAVING IMPROVED RELIABILITY FOR DETECTING CARRIER ACQUISITION OR LOSS THEREOF

(75) Inventor: Zulfiquar Sayeed, East Windsor, NJ (US)

(73) Assignee: Agere Systems LLC, Allentown, PA (US)

( * ) Notice: Subject to any disclaimer, the term of this patent is extended or adjusted under 35 U.S.C. 154(b) by 123 days.

(21) Appl. No.: 13/301,146

(22) Filed: Nov. 21, 2011

(65) Prior Publication Data

US 2012/0128052 A1    May 24, 2012

Related U.S. Application Data

(63) Continuation of application No. 09/795,726, filed on Feb. 28, 2001, now abandoned.

(51) Int. Cl.
*H04J 3/14* (2006.01)
*H04J 3/06* (2006.01)

(52) U.S. Cl.
USPC ...... 370/252; 370/503; 455/67.13; 455/115.1

(58) Field of Classification Search
USPC .................. 370/252, 503, 516; 455/8, 9, 10, 455/67.13, 115.1
See application file for complete search history.

(56) References Cited

U.S. PATENT DOCUMENTS

| 5,654,955 | A | 8/1997 | Natali |
|---|---|---|---|
| 5,982,809 | A | 11/1999 | Liu et al. |
| 6,091,932 | A | 7/2000 | Langlais |
| 6,208,695 | B1 | 3/2001 | Klank et al. |
| 6,246,735 | B1 | 6/2001 | Sano et al. |
| 6,356,748 | B1 | 3/2002 | Namgoong et al. |
| 6,381,251 | B1 | 4/2002 | Sano et al. |
| 6,594,320 | B1 | 7/2003 | Sayeed |
| 7,573,807 | B1 | 8/2009 | Riazi et al. |

OTHER PUBLICATIONS

Beek et al., "A Time and Frequency Synchronization Scheme for Multiuser OFDM," IEEE Journal on Selected Areas in Communications, vol. 17, No. 11 (Nov. 1999).
J. van de Beek et al., "A Time and Frequency Synchronization Scheme for Multiuser OFDM," IEEE Journal on Selected Areas in Communications, vol. 17, No. 11 (Nov. 1999).
U.S. Appl. No. 09/382,847, filed Aug. 25, 1999, entitled "Orthogonal Frequency Division Multiplexed (OFDM) Carrier Acquisition Method."
U.S. Appl. No. 09/398,502, filed Sep. 17, 1999, entitled "Method and Apparatus for Performing Differential Modulation Over Frequency in an Orthogonal Frequency Division Multiplexing (OFDM) Communication System."

*Primary Examiner* — Andrew Lee
(74) *Attorney, Agent, or Firm* — Ryan, Mason & Lewis, LLP (57) ABSTRACT

A carrier signal acquisition technique is disclosed. An improved course carrier frequency offset algorithm is employed in conjunction with a conventional fine carrier frequency offset algorithm. The course carrier frequency offset algorithm estimates large offsets that are multiples of the carrier spacing that may occur at system startup. A spectral null is placed in the center of the transmit spectrum and is thereafter located in a received signal. The position of the spectral null provides an estimate of the local oscillator carrier offset. A frequency finite state machine (FSM) processes a number of metrics to ensure the reliability of the course carrier frequency offset and of transitions between acquisition and tracking modes. The frequency FSM will utilize the frequency offset (modin) generated by a MODSC algorithm provided one or more predefined thresholds are satisfied.

28 Claims, 5 Drawing Sheets

CARRIER FREQUENCY ACQUISITION METHOD AND APPARATUS HAVING IMPROVED RELIABILITY FOR DETECTING CARRIER ACQUISITION OR LOSS THEREOF

CROSS-REFERENCE TO RELATED APPLICATIONS

This application is a continuation of U.S. patent application Ser. No. 09/795,726, filed Feb. 28, 2001 and related to U.S. patent application Ser. No. 09/382,847, filed Aug. 25, 1999, entitled "Orthogonal Frequency Division Multiplexed (OFDM) Carrier Acquisition Method," and U.S. patent application Ser. No. 09/398,502, filed Sep. 17, 1999, entitled "Method and Apparatus for Performing Differential Modulation Over Frequency in an Orthogonal Frequency Division Multiplexing (OFDM) Communication System," each assigned to the assignee of the present invention and incorporated by reference herein.

FIELD OF THE INVENTION

The present invention relates to wireless communication systems, and more particularly, to methods and apparatus for performing carrier acquisition in an orthogonal frequency division multiplexing (OFDM) communication system or another communication system.

BACKGROUND OF THE INVENTION

Satellite broadcasting systems for transmitting programming content have become increasingly popular in many parts of the world. Direct Broadcasting Satellite (DBS) systems transmit television programming content, for example, to a geo-stationary satellite, which broadcasts the content back to the customers. In such a wireless broadcast environment, the transmitted programming can be received by anyone with an appropriate receiver, such as an antenna or a satellite dish.

In addition, a number of satellite broadcasting systems have been proposed or suggested for broadcasting audio programming content from geo-stationary satellites to customers in a large coverage area, such as the continental United States. Proposed systems for providing digital audio broadcasting (DAB), for example, are expected to provide near CD-quality audio, data services and more robust coverage, than existing analog FM transmissions. Satellite broadcasting systems for television and radio content provide potentially national coverage areas, and thus improve over conventional terrestrial television stations and AM/FM radio stations that provide only regional coverage.

Satellite broadcasting systems transmit digital music and other information from an uplink station to one or more mobile receivers. Satellite broadcasting systems typically include a plurality of satellites and terrestrial repeaters operating in a broadcast mode. The satellites are typically geo-stationary, and are located over a desired geographical coverage area. The terrestrial repeaters typically operate in dense urban areas, where the direct line of sight (LOS) between the satellites and the mobile receiver can be blocked due to the angle of elevation and shadowing by tall buildings.

Orthogonal frequency division multiplexing (OFDM) techniques have also been proposed for use in such satellite broadcasting systems and other wireless networks. In an OFDM communication system, the digital signal is modulated to a plurality of small sub-carrier frequencies that are then transmitted in parallel. It has been found that OFDM communication systems do not require complex equalizers, even at high data rates and under multipath propagation conditions. Among other benefits, OFDM communication systems provide a guard interval that absorbs the multipath distortion into the guard interval duration. As long as the arrival times of the multipath signals differ from one another by less than the guard interval, an equalizer is not necessary.

OFDM communication systems are especially sensitive to frequency offsets in the carrier signal. Typically. OFDM systems use additional pilot and/or synchronization signals to perform the initial acquisition of the carrier signal. One popular technique utilizes training sequences over two consecutive OFDM symbols. While this technique acquires the carrier signal in a satisfactory manner, it suffers from a number of limitations, which if overcome, could greatly expand the efficiency of OFDM communication systems. More specifically, prior techniques relying on additional pilot and/or synchronization signals reduce the effective OFDM capacity for carrying data, which is unsatisfactory for capacity-limited systems.

Another technique for acquiring the carrier signal, referred to as the Guard Interval Based (GIB) algorithm, can only distinguish to within one half of the inter-carrier spacing. Thus, the GIB algorithm is insufficient for estimating frequency offsets that are greater than one half of the inter-carrier spacing, which are typical at system startup. For a more detailed discussion of the GIB algorithm, see, for example, Jan-Jaap van de Beek et al., ML Estimation of Time and Frequency Offset in OFDM Systems, IEEE Transactions on Signal Processing, Vol. 45, No 7, 1800-05 (July 1997) or Jan-Jaap an de Beek et al., "A Time and Frequency Synchronization Scheme for Multiuser OFDM," IEEE J. on Selected Areas in Communications, Vol. 17, No. 11, 1900-14, (November 1999), each incorporated by reference herein.

U.S. patent application Ser. No. 09/382,847, filed Aug. 25, 1999, entitled "Orthogonal Frequency Division Multiplexed (OFDM) Carrier Acquisition Method," assigned to the assignee of the present invention and incorporated by reference herein, discloses an improved technique, referred to herein as the modulo-subcarrier (MODSC) algorithm, for acquiring the carrier signal. The MODSC algorithm inserts a spectral null in the transmitted OFDM signal at a predefined location, locates the spectral null at the receiver and uses the shifting of the spectral null to estimate the local oscillator carrier offset. The location of the detected null estimates the carrier offset in units of the number of intercarrier spacings. Among other benefits, the MODSC algorithm does not require the use of additional pilot signals and thus optimizes the bandwidth utilization.

While the MODSC algorithm accurately determines the carrier offset without reducing the effective bandwidth utilization, a further need exists for a method and apparatus that acquires the carrier signal and also declares when the carrier signal has been acquired or when a false-lock or out-of-lock condition has occurred. Another need exists for a method and apparatus that acquires the carrier signal and that provides for reliable transitions between acquisition and tracking modes.

SUMMARY OF THE INVENTION

Generally, a method and apparatus are disclosed for acquiring a carrier signal in a communication system and ensuring the reliability of the carrier frequency offset. The present invention employs an improved course carrier frequency offset algorithm, as well as a conventional fine carrier frequency offset algorithm. The course carrier frequency offset algorithm associated with the present invention estimates large offsets that are multiples of the carrier spacing that may occur at system startup using the MODSC algorithm discussed above. The fine carrier frequency offset algorithm identifies a local oscillator carrier offset within one half the inter-carrier spacing.

According to one aspect of the invention, a frequency finite state machine (FSM) is disclosed that processes a number of metrics to ensure the reliability of the course carrier frequency offset and of transitions between acquisition and tracking modes. A first metric value, c2adj, is the normalized ratio of average power (excluding null carrier power) of carriers to the null carrier power. A second metric, p2av, is the normalized ratio of average power (excluding minimum carrier power) of carriers to the minimum carrier power. The frequency FSM will utilize the frequency offset (modin) generated by a MODSC algorithm provided one or more predefined thresholds are satisfied. Generally, if one of the conditions fail, then the signal-to-noise ratio is insufficient to reliably determine the frequency offset.

From a process point of view, a frequency FSM process utilizes the ratios of the powers of the carriers (p2av and c2adj) to determine if their averaged difference is less than some predefined threshold. The averaging is done over a fixed number of OFDM frames. If the average difference is less than the predefined threshold, then frequency acquisition is completed. Similarly, while in tracking mode, the difference of the ratios of powers is compared. If the differences are consistently greater than the threshold, then loss of track is achieved and the frequency FSM process will switch operation to the acquisition mode. The frequency offset generated by the frequency FSM (modout) is same as modin in the tracking mode and is 0 in the acquisition mode.

A more complete understanding of the present invention, as well as further features and advantages of the present invention, will be obtained by reference to the following detailed description and drawings.

DETAILED DESCRIPTION

The carrier acquisition method and apparatus of the present invention are illustrated in connection with an exemplary OFDM communication system. Although described in connection with an exemplary wireless OFDM communication system, it will be understood that the present invention is equally applicable to a wired discrete multi-tone (DMT) communication system. The functionality performed by the transmitter and receiver sections of an exemplary OFDM system are discussed below in conjunction with FIGS. 1 and 2, respectively. The carrier acquisition techniques of the present invention are then discussed below in conjunction with FIGS. 3 and 5.

OFDM Terminology and Signal Parameters

Generally, in an exemplary OFDM communication system, a digital signal is transmitted as a plurality of parallel sub-carries (also known as "bins"). Collectively, these sub-carriers are referred to an OFDM "symbol," However, only some of the sub-carriers actually contain information about the signal, referred to as "active sub-carriers." The remaining sub-carriers are nulled, i.e., filled with zeroes, and thus, are referred to as "inactive sub-carriers." An inverse Fast Fourier Transform (IFFT) of a significantly longer length than the number of active sub-carriers is then used to encode the signal for transmission to an OFDM receiver. In particular, the IFFT length is maintained at twice the number of sub-carriers in order to properly reproduce the highest frequency sub-carriers and avoid the effects of aliasing.

In the illustrative embodiment, each OFDM symbol of duration Ts will be composed of 2048 samples corresponding to the useful symbol duration and 184 samples corresponding to the guard interval, and the symbol represents up to 2048 sub-carriers each spaced 4 kHz apart ($\Delta f$). The useful OFDM symbol duration. Tu, illustratively equals 250 mu-sec and the guard interval duration or cyclic prefix duration, Tg, illustratively equals 22.46 mu-sec. The duration of the symbol, Ts, is 272.46 mu-sec. where Ts equals Tu plus Tg. The inter-carrier spacing, $\Delta f$, of 4 KHz is equal to the inverse of the useful symbol duration (1/Tu).

OFDM Carrier Acquisition

According to one feature of the present invention, the OFDM receiver 200, discussed below in conjunction with FIG. 2, employs a course carrier frequency offset algorithm, in accordance with the present invention, as well as a conventional fine carrier frequency offset algorithm. As discussed hereinafter, the course carrier frequency offset algorithm which is the focus of the present invention is embodied as the MODSC algorithm and can estimate large offsets that are multiples of the carrier spacing (4 KHz) that may occur at system startup. The fine carrier frequency offset algorithm must identify a local oscillator carrier offset within one half the inter-carrier spacing. Thus, the fine carrier frequency offset algorithm can detect the carrier offset and correct the local oscillator even when the spectral null moves to the middle of the sub-carrier spacing.

Thus, if the local oscillator moves the spectrum by one half of the inter-carrier spacing (2 KHz in the exemplary OFDM communication system), the MODSC algorithm will not be able to detect the null at the output of the FFT. Once the offset moves sufficiently away from the middle of the sub-carrier separation, the MODSC algorithm can detect the integral part of the offset and remove the inherent ambiguity equal to the inter-carrier spacing (4 KHz in the exemplary embodiment) due to the $2\pi$ periodicity of the fine carrier tracking estimate. Therefore, the course and line carrier frequency offset algorithms work together in estimating the local oscillator carrier offset more quickly and with greater accuracy than the carrier tracking algorithm alone.

The fine carrier frequency offset algorithm may be embodied, for example, as the well-known Guard Interval Based (GIB) algorithm described in, e.g., Jan-Jaap van de Beek et al., ML Estimation of Time and Frequency Offset in OFDM Systems, IEEE Transactions on Signal Processing, Vol. 45, No 7, 1800-05 (July 1997) or Jan-Jaap van de Beek et al., "A Time and Frequency Synchronization Scheme for Multiuser OFDM," IEEE J. on Selected Areas in Communications, Vol. 17, No, 11, 1900-4, (November 1999), each incorporated by reference herein. In addition, the manner in which the MODSC course carrier frequency offset algorithm and the fine carrier frequency offset algorithm cooperate to estimate the local oscillator carrier offset is described in U.S. patent application Ser. No. 09/382,847, filed Aug. 25, 1999, entitled "Orthogonal Frequency Division Multiplexed (OFDM) Carrier Acquisition Method," assigned to the assignee of the present invention and incorporated by reference herein. Since the fine carrier frequency offset algorithm is not the focus of the present invention, the reader is referred to these references for a more detailed discussion.

Figure 1:
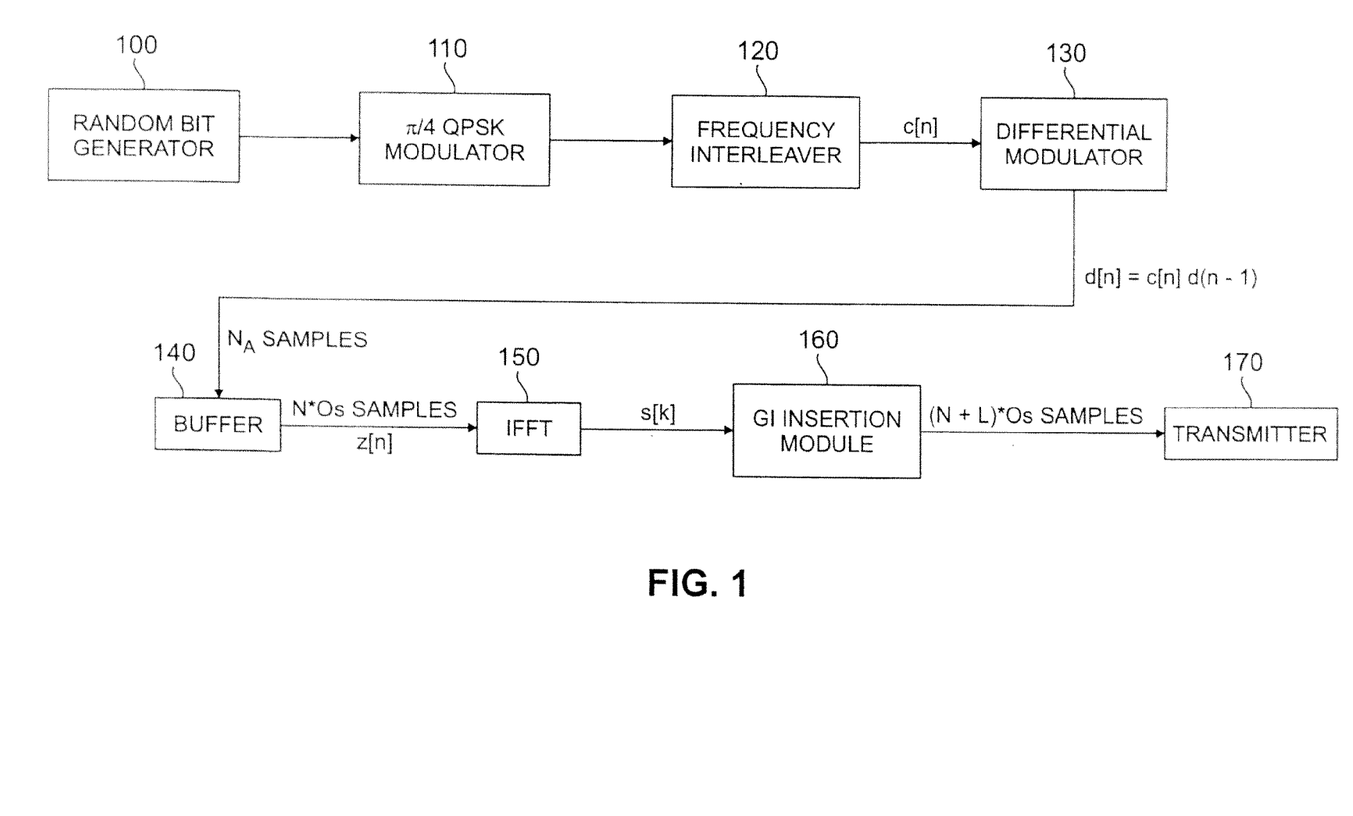
FIG. 1 is a schematic block diagram illustrating an exemplary OFDM transmitter.

In accordance with the carrier offset estimation technique of the present invention, the OFDM transmitter, shown in FIG. 1, places a spectral null in the center of the transmit spectrum. FIG. 1 is a schematic block diagram illustrating an exemplary OFDM transmitter. As shown in FIG. 1, a random bit generator 100 is used to generate a digital data stream (i.e., I and Q pairs). The I and Q pairs are applied to a π/4 QPSK modulator 110 that generates an active sub-carrier by mapping each I and Q pair to a QPSK constellation, in a known manner. Active sub-carriers from the modulator are then sent to a frequency interleaver 120 where they are frequency interleaved over one OFDM symbol (i.e., $N_a$ sub-carriers or, in the exemplary embodiment, 1002 sub-carriers). In the exemplary embodiment, the frequency interleaver 120 comprises a matrix of R rows and C columns where R equals 61 and C equals 16 to accommodate the 1002 active sub-carriers for each symbol. The sub-carriers are written into the matrix row-by-row and are read therefrom column-by-column to effect the interleaving. The output of the frequency interleaver 120 (c[n], where, in the exemplary embodiment, n=1 to 1002 sub-carriers) is then fed to a differential modulator 130.

The output of the differential modulator 130 comprises complex elements d[n]=c[n]d[n−1], where, in the exemplary embodiment, n=1 to 1002 active sub-carriers. The output of the differential modulator 130 for each symbol is then sent to and stored in a buffer 140 of width equal to N*Os sub-carriers, where N is the number of sub-carriers and Os is the over-sampling rate. Thus, in the exemplary embodiment, the buffer 140 is 2048 sub-carriers wide. The spectral null is inserted at the center of the transmit spectrum in accordance with the present invention by loading a zero complex value in the first location in the buffer 140 (i.e., with z[0]=0). This null is used in the carrier acquisition method described herein. The next Na/2 locations in buffer 140 are loaded with the samples corresponding to the first set of Na/2 active sub-carriers, where Na is the number of active sub-carriers. The next (N*Os)−Na−1 locations in buffer 140 are then padded with zeros corresponding to the inactive sub-carriers. As will be discussed hereinafter, the insertion of zeros in these locations of the buffer 140 will facilitate using a larger IFFT size than the number of active sub-carriers thereby ensuring that the highest frequency sub-carriers will be at least 2× over-sampled to eliminate the adverse effects of aliasing. Finally, the last Na/2 locations in the buffer 140 are loaded with samples corresponding to the remaining or second set of Na/2 active sub-carriers. The contents of buffer 140 represents the OFDM symbol in the frequency domain. In radian frequency, the 0th sub-carrier corresponds to 0 radians and the 2047$^{th}$ sub-carrier corresponds to 2π radians.

The contents of the buffer 140 are then transmitted to an IFFT 150 for conversion from the frequency domain to the time domain. The IFFT 150 is of length Na*Os. In the exemplary embodiment. N and Os are 1024 and 2× over-sampling, respectively. The output of the IFFT 150 is the time domain representation of the symbol as defined by:

$$s[k] = \sum_{n=Na/2}^{Na/2} z[n] \cdot \exp(j \cdot 2\pi \cdot n / N \cdot O_s)$$

Thus, the output of the IFFT 150 will be time domain samples for N*Os sub-carriers or, in the exemplary embodiment, samples for 2048 sub-carriers. As discussed above, however, d[n] will equal zero for n=0 and for each of the (N*Os)−(Na−1) inactive sub-carriers. Next, the N*Os samples are sent to GI Insertion Module 160 where a guard interval of length L*Os is added to the symbol. The guard interval is an exact duplicate of the last L*Os samples of the OFDM symbol which gets prepended to the transmitted symbol. In the exemplary embodiment, the length L of the guard interval is 184 samples. Thus, the total length of the transmitted symbol is (N+L)*Os samples or, in the exemplary embodiment, 2,232 samples.

Next, the symbol is sent to a transmitter 170 that includes a digital-to-analog (D/A) converter operating at Fs=N*(F/Na)*Os Hz (in the exemplary embodiment, 8.192 MHz) and is converted from digital to analog. The D/A converter imposes a sin x/x spectrum onto each sub-carrier. After D/A conversion, the 0th sub-carrier of the symbol will be located at 0 Hz and extend to 4 KHz, and the 2047th sub-carrier will be located at 8.188 MHz and extend to 8.192 MHz. However, as is well known in the art, a digital signal replicates itself every 2π radians. Thus, the sample and hold function of the D/A converter will serve to filter out any replicas of the symbol and retain only that portion of the symbol extending from −N*(F/Na) Hz to +N*(F/Na) Hz (i.e., −4.096 MHz to +4.096:MHz in the exemplary OFDM system) for transmission to the OFDM receiver (FIG. 2). However, the energy content of the inactive sub-carriers is almost zero. Thus, the active sub-carriers will be transmitted such that the 0$^{th}$ sub-carrier will be located at 0 Hz; the first set of Na/2 sub-carriers will be located from 0 Hz to F/2 Hz and the second set of Na/2 sub-carriers will be located at −F/2 Hz to 0 Hz.

Figure 2:
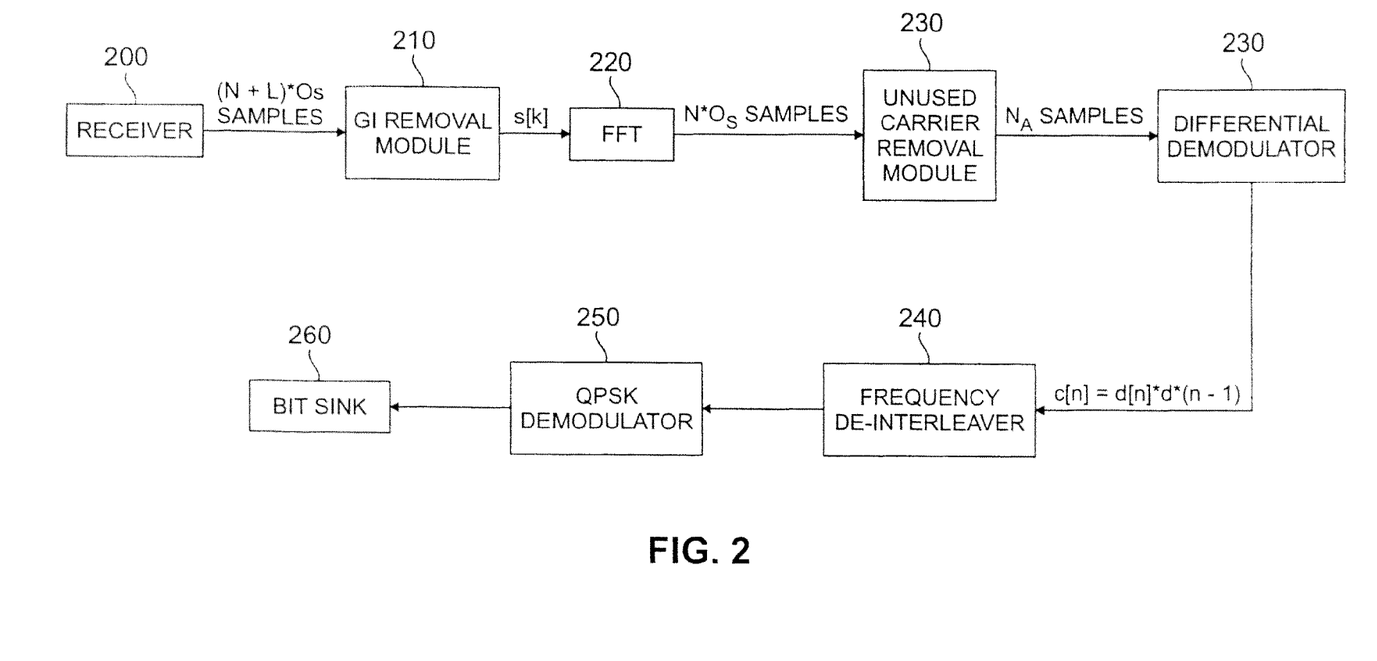
FIG. 2 is a schematic block diagram illustrating an exemplary OFDM receiver in which the present invention can operate.

FIG. 2 is a block diagram illustrating an exemplary OFDM receiver. It will be understood that, in a wireless system, the receiver may be located in a handset, a base station or the like. As shown in FIG. 2, samples corresponding to the sub-carriers of the OFDM symbol are received by the OFDM receiver 200 and converted from analog to digital. Next, the guard interval is removed by GI Removal Module 210 to obtain N*Os sub-carriers. The symbol is then applied to an FFT 220 of length L equal to N*Os for conversion from the time domain to the frequency domain. As discussed above, for purposes of carrier acquisition, a null will be present in the center of the spectrum if the receiver is tuned to the transmit carrier. After the FFT is performed, the inactive sub-carriers are discarded by unused carrier removal module 225, and the complex elements d[n] are sent to a differential demodulator 230. Demodulation results in active sub-carriers c[n]=d[n]d*[n−1]. The active sub-carriers are then sent to a frequency de-interleaver 240 and thereafter to a QPSK demodulator 250. After QPSK de-modulation, the digital bits are sent to a data sink 260 for application-specific processing.

Figure 3:
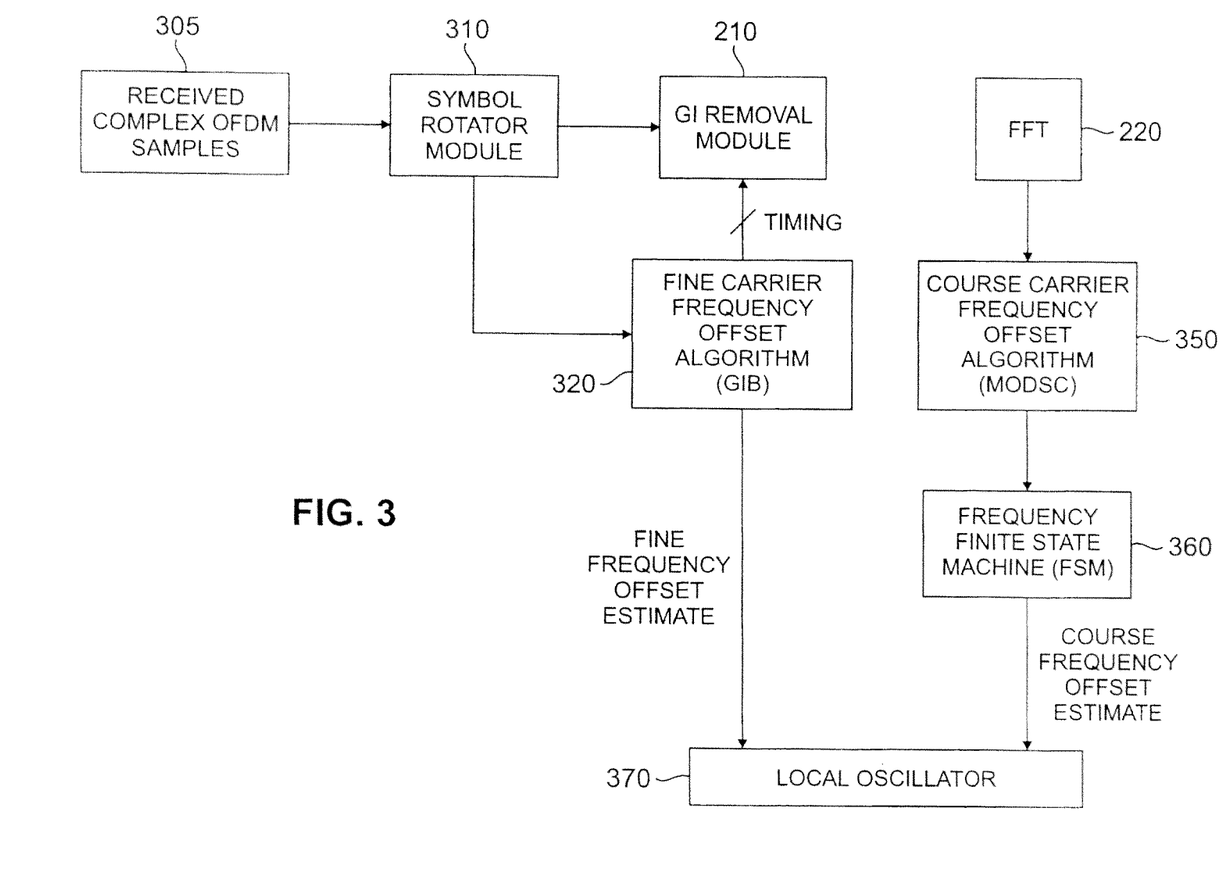
FIG. 3 is a schematic block diagram illustrating a carrier acquisition method in accordance with the present invention.

FIG. 3 illustrates the OFDM carrier acquisition method of the present invention. As discussed above, it is used to estimate and correct the initial local oscillator carrier offset (course) for the OFDM signal in the exemplary OFDM system. As shown in FIG. 3, the received complex baseband OFDM samples 305 are rotated by the integrated phase due to the local oscillator carrier offset in Symbol Rotator Module 310. These samples are then sent to the GI Removal Module 210 where the guard interval is removed. The samples are applied to the FFT operation 220, and the carrier acquisition process in accordance with the present invention begins. As previously indicated, the carrier acquisition process of the present invention employs a course carrier frequency offset algorithm (MODSC) 350 as well as a conventional fine carrier frequency offset algorithm (GIB) 320. The MODSC algorithm estimates large offsets that are multiples of the carrier spacing (4 KHz) that may occur at system startup. The fine carrier frequency offset algorithm must identify a local oscillator carrier offset within one half the inter-carrier spacing.

As discussed further below in conjunction with FIG. 4, the course frequency offset generated by the MODSC algorithm is further processed by a frequency finite state machine (FSM) 360 to ensure the reliability of the course carrier frequency offset and of transitions between acquisition and tracking modes. The fine and course frequency offsets generated by the GIB and MODSC algorithms 320, 350, respectively, are applied to the local oscillator 370 to control the tracking of the carrier frequency.

Figure 4:
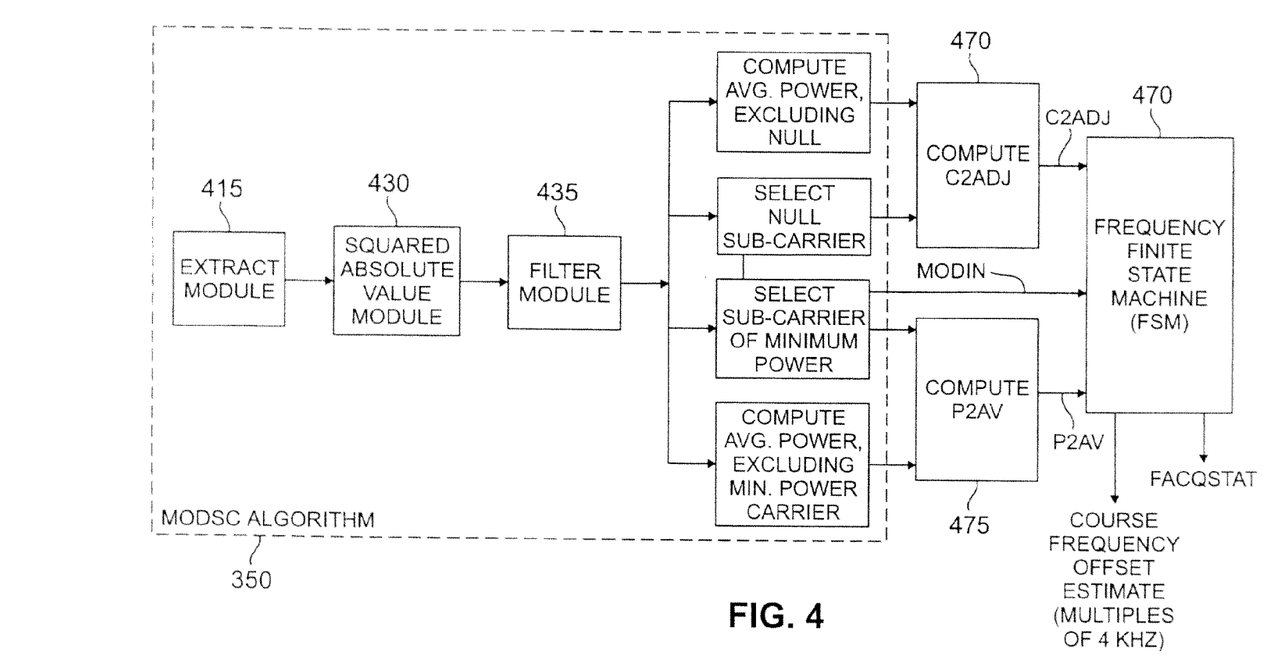
FIG. 4 is a schematic block diagram illustrating the MODSC and frequency FSM blocks of FIG. 3 in further detail.
Figure 5:
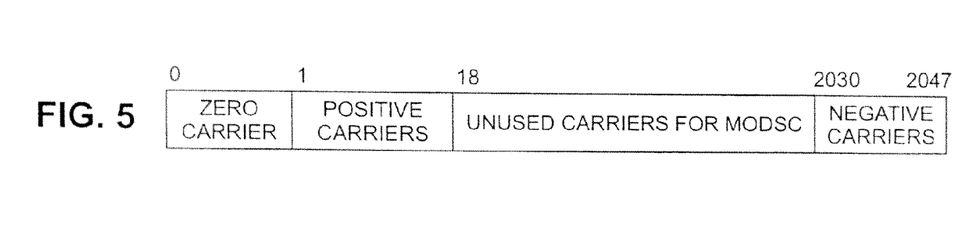
FIG. 5 illustrates the sub-carrier assignment utilized by the MODSC algorithm as generated by the Fast Fourier Transform (FFT) stage of FIG. 3.

FIG. 4 is a schematic block diagram illustrating the operation of the MODSC block 350 and frequency FSM block 360 of FIG. 3 in further detail. As shown in FIG. 4, the first step in the MODSC algorithm 350 is the extraction of the appropriate number of sub-carriers in the extract module 415. The extracted FFT sub-carrier bins have integer indices with the central sub-carrier having an index of 0. For example, in a system where 37 sub-carriers are extracted, the sub-carrier bins would have the following indices: −18, −17, . . . −2, −1, 0, 1, 2, . . . 17, 18. As shown in FIG. 5, the output of the FFT stage 220 (FIG. 3) is 2048 complex samples. Of these 2048 samples, 37 samples (sub-carrier outputs) are extracted by the extract module 415, as follows:

y(k)=fft_buffer(k) 0<=k<=18
y(−k)=fft_buffer(2048−k) 1<=k<=18

In other words, the desired 37 central bins are extracted from sample positions 0 through 18 and 2030 through 2047.

Once the extraction operation is completed, the extracted FFT bins can be observed to locate the null, which indicates the MODSC offset estimate. Specifically, the MODSC algorithm 350 distinguishes whether the local oscillator carrier offset is an integer, i.e., . . . −2, −1, 0, 1, 2 . . . , sub-carriers away from the central position, which is equivalent to . . . −8 KHz, −4 KHz, 0 KHz, 4 KHz, 8 KHz in the exemplary OFDM system. While a per-sub-carrier based operation on all the available sub-carriers can be performed, it is unnecessary. The number of sub-carriers that are needed depends on the parts-per-million (ppm) accuracy of the local oscillator 370 and the carrier frequency. In the exemplary OFDM system, where the local oscillator accuracy is 8 ppm, the per-sub-carrier operations can be constrained to sub-carriers: −4, −3, . . . 0, . . . 3, 4 because 2*M+1 sub-carrier tracking can generally estimate +/−M*(Δf) (Hz).

The absolute values of the extracted FFT outputs are then calculated on a per-sub-carrier basis in the absolute value module 430. Because the location of the null is rendered uncertain by channel noise and fading, the extracted FFT outputs are preferably filtered on a per-sub-carrier basis to remove or mitigate the effects of the channel in the filter module 435, which may be embodied as, e.g., 16-tap moving average filters. After the filtering operation 435, four operations are performed in parallel. More specifically, the average power of the 37 central sub-carriers is computed at stage 450, excluding the power associated with the null carrier (0). The null carrier is selected at stage 455. The sub-carrier having the minimum power is selected during stage 460 (modin) indicating the offset in multiples of sub-carrier spacing. In addition, the average power of the 37 central sub-carriers is computed at stage 465, excluding the power associated with the minimum power carrier (selected at state 460).

Following the various computations performed during stages 450-465 of the MODSC algorithm 350, the present invention computes additional metrics that are utilized by the frequency FSM 360 to improve the reliability of transitions between acquisition and tracking modes. As shown in FIG. 4, a value, c2adj, is computed during stage 470, as follows:

$$c2adj = \left[\frac{F_{ave}}{F_0}\right],$$

where $F_0$ is the null carrier power and $F_{ave}$ is the average power of adjacent carriers. Thus, c2adj is the normalized ratio of average power (excluding null carrier power) of carriers to the null carrier power.

A value, p2av, is computed during stage 475, as follows:

$$p2av = \left[\frac{F_{ave}}{F_{min}}\right],$$

where $F_{min}$ is the minimum carrier power of the 37 central carriers. Thus, p2av is the normalized ratio of average power (excluding minimum carrier power) of carriers to the minimum carrier power.

Figure 6:
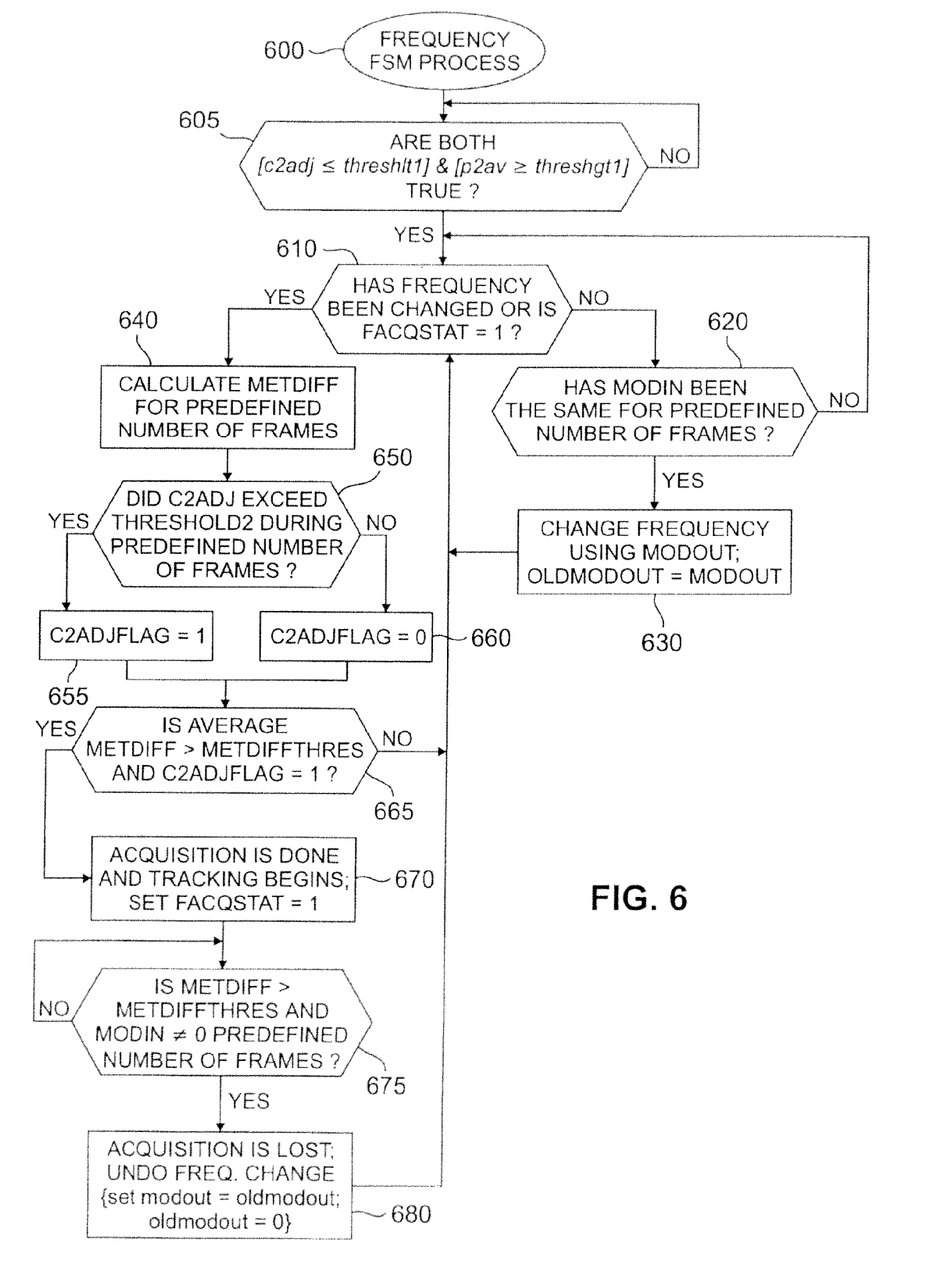
FIG. 6 is a flow chart describing a frequency FSM process implemented by the frequency FSM shown in FIG. 3.

The present invention provides improved reliability of the course frequency offset estimate and of the transitions between acquisition and tracking modes using a number of thresholds. Thus, as discussed further below in conjunction with FIG. 6, the metric modin generated by the MODSC algorithm 350 is modified to incorporate thresholds based on the metrics c2adj and p2av, as follows:

mod in$_{new}$=E·Min_index·4 KHz, where Min_Index is index of the carrier with minimum power, in the range −18 to 18, and E=1 if [c2adj≦threshlt1]&[p2av≧threshgt1], are true 0 otherwise Thus, if at least one of the conditions fail, the modin expression will evaluate to zero and the frequency offset falls back to the central carrier (zero frequency offset). Generally, if one of the conditions fail, then the signal-to-noise ratio is insufficient to reliably determine the frequency offset.

As shown in FIG. 4, the frequency FSM 360 also generates a signal, FACQSTAT (frequency acquired status) that can be used by other parts of the OFDM receiver to monitor the system state. The output FACQSTAT is a binary value of one (1) in the tracking mode and it is a binary value of zero (0) in the acquisition mode.

FIG. 6 is a flow chart describing a frequency FSM process 600 implemented by the frequency FSM 360 shown in FIGS. 3 and 4. Generally, the frequency FSM process 600 provides reliable transitions between acquisition and tracking modes. The frequency FSM process 600 uses the ratios of the powers of the carriers (p2av and c2adj) to determine if their averaged difference is less than some predefined threshold. The averaging is done over a fixed number of OFDM frames. If the average difference is less than the predefined threshold, then frequency acquisition is completed. Similarly, while in tracking mode, the difference of the ratios of powers is compared. If the differences are consistently greater than the threshold, then loss of track is achieved and the frequency FSM process 600 will switch operation to the acquisition mode. The output FACQSTAT is a binary value of one (1) in the tracking mode and it is a binary value of zero (0) in the acquisition mode. The modout is same as modin in the tracking mode and it is 0 in the acquisition mode.

Thus, as shown in FIG. 6, the frequency FSM process 600 initially performs a test during step 605 to ensure that the metric values c2adj and p2av satisfy the following condition:

$$[c2adj \leq threshlt1] \& [p2av \geq threshgt1].$$

If it is determined during step 605 that the metric values c2adj and p2av do not satisfy the specified condition, then the modin value does not have sufficient reliability and program control returns to step 605 until the modin value has sufficient reliability.

If, however, it is determined during step 605 that the metric values c2adj and p2av satisfy the specified condition, then the modin value has sufficient reliability and program control proceeds to step 610 where a test is performed to determine if the frequency has been changed or if FACQSTAT equals one (indicating that acquisition was previously achieved).

If it is determined during step 610 that the frequency has not been changed and FACQSTAT does not equal one, then program control proceeds to steps 620 and 630 to make a frequency change. Thus, a further test is performed during step 620 to determine if modin has been the same for a predefined number of frames. If it is determined during step 620 that modin has not been the same for a predefined number of frames, then program control returns to step 620 until this condition is satisfied.

If, however, it is determined during step 620 that modin has been the same for a predefined number of frames, then the frequency is changed during step 630 using modout, and modout is recorded as oldmodout. Program control then returns to step 610.

If, however, it is determined during step 610 that the frequency has been changed or that FACQSTAT equals one, then a metdiff value is computed during step 640 over a predefined number of frames as the absolute value of the difference between the metric values c2adj and p2av. A test is performed during step 650 to determine if c2adj exceeds a threshold at least once during a predefined number of frames. A more stringent threshold can optionally be applied to c2adj during step 650 than was applied during step 605 since satisfying the threshold will place the FSM in a tracking mode.

If it is determined during step 650 that c2adj does exceed a threshold at least once during a predefined number of frames, then a flag is set during step 655. If, however, it is determined during step 650 that c2adj does not exceed a threshold at least once during a predefined number of frames, then the flag is not set. A further test is performed during step 665 to determine if the average metdiff (calculated during step 640) is greater than a defined threshold and that the c2adj flag has been set. If it is determined during step 665 that the average metdiff is not greater than a defined threshold or the c2adj flag has not been set, then program control returns to step 610 and continues in the manner described above.

If, however, it is determined during step 665 that the average metdiff is greater than a defined threshold and the c2adj flag has been set, then acquisition is complete (null has moved to center) and tracking may begin. The status flag FACQSTAT is set during step 670. A further test is performed during step 675 to again determine if the average metdiff (calculated during step 640) is greater than a defined threshold and modin does not equal zero for a predefined number of frames.

If it is determined during step 675 that the average metdiff is not greater than the threshold or that modin equals zero for a predefined number of frames, then program control returns to step 610 and continues in the manner described above. If, however, it is determined during step 675 that the average metdiff is greater than a defined threshold and modin does not equal zero for a predefined number of frames, then acquisition is lost and the frequency change that was made is undone during step 680, before program control returns to step 610 and continues in the manner described above.

While there are 37 sub-carriers tracked in the exemplary modsc block, all absolute frequency offsets greater than 36000 are ignored by the frequency FSM 360 in the acquisition mode. However, the entire 2*72000 Hz offsets (all 37 sub-carriers) are used in declaring false acquisitions during step 675.

It is to be understood that the embodiments and variations shown and described herein are merely illustrative of the principles of this invention and that various modifications may be implemented by those skilled in the art without departing from the scope and spirit of the invention.

I claim:

1. A method for determining a local oscillator carrier offset frequency in a communication system, said method comprising the steps of:
   receiving a signal having at least one spectral null inserted therein;
   locating a position of said spectral null in said signal;
   monitoring one or more metrics to identify loss of synchronization; and
   using said position of said spectral null to estimate said local oscillator carrier offset frequency if said monitoring step identifies a loss of synchronization.

2. The method according to claim 1, wherein said signal is an OFDM signal.

3. The method according to claim 1, wherein said signal is a DMT signal.

4. The method according to claim 1, wherein said one or more metrics are based on a signal-to-noise ratio.

5. The method according to claim 1, wherein said one or more metrics are based on a ratio of the powers of the carriers to determine if their averaged difference is less than some predefined threshold.

6. The method according to claim 5, wherein an acquisition mode is complete if said averaged difference is less than said predefined threshold.

7. The method according to claim 1, wherein the one or more metrics are based on a ratio of the powers of the carriers and a loss of synchronization is detected if averaged differences of the ratio of the powers of the carriers are consistently greater than a threshold.

8. The method according to claim 1, wherein the one or more metrics are based on a ratio of the powers of the carriers and a modin value and a loss of synchronization is detected if averaged differences of the ratio of the powers of the carriers are consistently greater than a threshold and a modin value is non-zero for a predefined number of frames.

9. The method according to claim 1, wherein said local oscillator carrier offset frequency is determined by said position of said spectral null in a tracking mode and is zero in an acquisition mode.

10. The method according to claim 1, further comprising the steps of:
    extracting a plurality of sub-carriers of said signal after a fast fourier transform (FFT) operation;
    determining a minimum energy sub-carrier of said plurality of sub-carriers;
    calculating at least one average energy of said plurality of sub-carriers, excluding an energy of said minimum energy sub-carrier;
    comparing a ratio of said average energy and said energy of said minimum energy sub-carrier to a predefined threshold; and
    multiplying an index of said minimum energy sub-carrier by an inter-carrier spacing to generate said local oscillator carrier offset frequency.

11. A system for determining a local oscillator carrier offset frequency in a communication system, comprising:
    a memory that stores computer-readable code and information relating to local oscillator carrier offset calculations; and
    a processor operatively coupled to said memory, said processor configured to implement said computer-readable code, said computer-readable code configured to:
    receive a signal having at least one spectral null inserted therein;
    locate a position of said spectral null in said signal; and
    monitoring one or more metrics to identify loss of synchronization;
    use said position of said spectral null to estimate said local oscillator carrier offset frequency if said monitoring step identifies a loss of synchronization.

12. The system according to claim 11, wherein said signal is an OFDM signal.

13. The system according to claim 11, wherein said signal is a DMT signal.

14. The system according to claim 11, wherein said one or more metrics are based on a signal-to-noise ratio.

15. The system according to claim 11, wherein said one or more metrics are based on a ratio of the powers of the carriers to determine if their averaged difference is less than some predefined threshold.

16. The system according to claim 15, wherein an acquisition mode is complete if said averaged difference is less than said predefined threshold.

17. The system according to claim 11, wherein the one or more metrics are based on a ratio of the powers of the carriers and a loss of synchronization is detected if averaged differences of the ratio of the powers of the carriers are consistently greater than a threshold.

18. The method according to claim 11, wherein the one or more metrics are based on a ratio of the powers of the carriers and a modin value and a loss of synchronization is detected if averaged differences of the ratio of the powers of the carriers are consistently greater than a threshold and a modin value is non-zero for a predefined number of frames.

19. The system according to claim 11, wherein said local oscillator carrier offset frequency is determined by said position of said spectral null in a tracking mode and is zero in an acquisition mode.

20. The system according to claim 11, wherein said processor is further configured to:
    extract a plurality of sub-carriers of said signal after a fast fourier transform (FFT) operation;
    determine a minimum energy sub-carrier of said plurality of sub-carriers;
    calculate at least one average energy of said plurality of sub-carriers, excluding an energy of said minimum energy sub-carrier;
    compare a ratio of said average energy and said energy of said minimum energy sub-carrier to a predefined threshold; and
    multiply an index of said minimum energy sub-carrier by an inter-carrier spacing to generate said local oscillator carrier offset frequency.

21. A communication system, comprising:
    a receiver for receiving a signal having at least one spectral null inserted therein;
    means for locating a position of said spectral null in said signal; and
    means for monitoring one or more metrics to identify loss of synchronization;
    means for using said position of said spectral null to estimate said local oscillator carrier offset frequency if said monitoring step identifies a loss of synchronization.

22. The communication system according to claim 21, wherein said signal is an OFDM signal.

23. The communication system according to claim 21, wherein said signal is a DMT signal.

24. The communication system according, to claim 21, wherein said one or more metrics are based on a signal-to-noise ratio.

25. The communication system according to claim 21, wherein said one or more metrics are based on a ratio of the powers of the carriers to determine if their averaged difference is less than some predefined threshold.

26. The communication system according to claim 23, wherein an acquisition mode is complete if said averaged difference is less than said predefined threshold.

27. The communication system according to claim 21, wherein the one or more metrics are based on a ratio of the powers of the carriers and a loss of synchronization is detected if averaged differences of the ratio of the powers of the carriers are consistently greater than a threshold.

28. The method according to claim 21, wherein the one or more metrics are based on a ratio of the powers of the carriers and a modin value and a loss of synchronization is detected if averaged differences of the ratio of the powers of the carriers are consistently greater than a threshold and a modin value is non-zero for a predefined number of frames.

* * * * *